United States Patent

Hayashi et al.

[11] Patent Number: 5,753,016
[45] Date of Patent: May 19, 1998

[54] INK COMPOSITION EXCELLENT IN REPRODUCTION OF BLACK COLOR AND INK JET RECORDING METHOD USING THE SAME

[75] Inventors: Hiroko Hayashi; Miharu Kanaya; Yasuhiro Ouki; Akio Owatari, all of Suwa, Japan

[73] Assignee: Seiko Epson Corporation, Shinjuku-ku, Japan

[21] Appl. No.: 742,883

[22] Filed: Nov. 1, 1996

[30] Foreign Application Priority Data

| Nov. 2, 1995 | [JP] | Japan | 7-286293 |
| Nov. 20, 1995 | [JP] | Japan | 7-301729 |
| Jan. 19, 1996 | [JP] | Japan | 8-007219 |

[51] Int. Cl.$^6$ ..................... C09D 11/02
[52] U.S. Cl. ..................... 106/31.48; 106/31.51
[58] Field of Search ............. 106/22 K, 20 D, 106/31.48, 31.51; 534/727, 797, 829, 836

[56] References Cited

U.S. PATENT DOCUMENTS

| 4,661,158 | 4/1987 | Kobayashi et al. | 106/22 K |
| 4,963,189 | 10/1990 | Hindagolla | 106/22 K |
| 5,034,058 | 7/1991 | Akiyama et al. | 106/22 K |
| 5,053,495 | 10/1991 | Greenwod et al. | 106/22 K |
| 5,177,195 | 1/1993 | Gregory et al. | 106/22 K |
| 5,198,022 | 3/1993 | Aulick et al. | 106/22 K |
| 5,268,459 | 12/1993 | Gregory et al. | 106/22 K |
| 5,439,517 | 8/1995 | Yoshida et al. | 106/22 K |
| 5,478,384 | 12/1995 | Takimoto et al. | 106/22 K |

FOREIGN PATENT DOCUMENTS

| 102972 | 6/1982 | Japan | 106/22 K |

*Primary Examiner*—Helene Klemanski
*Attorney, Agent, or Firm*—Ladas & Parry

[57] ABSTRACT

An ink composition capable of offering a combination of a high-quality image with a waterfast image is provided. More specifically, an ink composition is provided which, by virtue of a combination of particular dyes, can faithfully reproduce black color, realize a high-quality image (a sharp image having a high optical density and free from bleed) also on plain paper and, at the same time, offer rapid ink fixation and waterfastness and lightfastness of the printed image. Dyes represented by the following formula (I) are used as a fundamental dye and further combined with a plurality of dyes to constitute the ink composition:

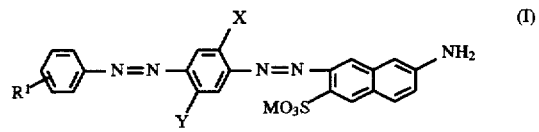

wherein $R^1$ represents $—PO(OM)_2$ or $—COOM$, X and Y each independently represent an alkoxy and M represents a cation of a group selected from the group consisting of a hydrogen atom, an alkali metal, ammonia, and an organic amine.

22 Claims, No Drawings

INK COMPOSITION EXCELLENT IN REPRODUCTION OF BLACK COLOR AND INK JET RECORDING METHOD USING THE SAME

BACKGROUND OF THE INVENTION

1. Field of the Invention

The present invention relates to an ink composition excellent in reproduction of black color and an ink jet recording method using the same.

2. Background Art

Inks used in an ink jet recording system typically comprise various dyes dissolved in water or an organic solvent or a mixed solution of water and the organic solvent. The inks for this purpose should satisfy more strict requirements than inks for writing materials such as pens and ballpoint pens.

Further, in recent years, regarding the ink jet recording system, there is an ever-increasing demand for higher quality images (sharp images having a higher optical density and free from bleed), higher printing speed, and better waterfastness and lightfastness.

Rapid fixation of an ink is requisite for realizing high-speed printing. Accordingly, an attempt has been made to improve the penetration of the ink into a recording medium. For example, Japanese Patent Laid-Open No. 183761/1992 and U.S. Pat. Nos. 5,156,675 and 5,183,502 disclose the addition of diethylene glycol monobutyl ether, the addition of both a glycol ether and a nonionic acetylene glycol surfactant and the like. In the present specification, an ink having a high capability of penetrating into a recording medium is often referred to as a "penetration" ink.

Since the penetration ink penetrates into paper well, it is likely to cause a deterioration in color development on recording media such as plain paper (including copying paper, memo pads, bond paper, letter paper, postcard, and voucher paper used in offices, schools and households) the surface of which has not been subjected to any special treatment. It is thus difficult to offer images having high optical density and sharpness. Increasing the concentration of the dye in ink to enhance the optical density results in a fear of posing a problem of reliability, such as clogging of nozzles. Thus, very high solubility is required of the dye for the penetration ink.

C.I. Food Black 2 (Japanese Patent Laid-Open No. 93766/1984) and many other direct and acidic dyes are well known as dyes having high solubility and, in fact, has been extensively used as an ink for ink jet recording. However, high solubility of the dye in water means that the dye is easily dissolved in water, resulting in the formation of an image having poor waterfastness.

In order to provide waterfastness, Japanese Patent Laid-Open No. 140495/1993 proposes an ink composition containing pyrrolidones (which refer to 2-pyrrolidone, N-(2-hydroxyethyl)-2-pyrrolidone or a mixture of them). Certainly, this ink composition is excellent in waterfastness of the printed image, and ejection stability of ink droplets. It, however, does not satisfactorily meet all the property requirements for the ink.

A waterfast black dye as a colorant and an ink containing this dye have been proposed in order to improve the waterfastness of prints. For example, U.S. Pat. Nos. 4,963,189 and 5,203,912 disclose dyes which are easily soluble in a base but do not dissolve in neutral water. Further, they propose inks which can provide prints having excellent waterfastness.

Japanese Patent Publication No. 80956/1993 proposes inks using disazo dyes having a phosphoric acid group, and Japanese Patent Laid-Open Nos. 91577/1991 and 262998/1993 and the like inks using disazo dyes having a carboxylic acid group.

Waterfast dyes, however, are less likely to dissolve in an ink medium and, hence, likely to unfavorably cause clogging of fine ejection nozzles of the ink-jet printing head. Further, they are also disadvantageously unsuitable for penetration inks.

On the other hand, faithful reproduction of black color is required of ink compositions. The hue of some dyes for black inks is bluish and somewhat different from an intrinsic black color (for example, a black color perceived, for example, from Chinese ink (sumi) or Japanese lacquer (urushi)). For this reason, combining auxiliary dyes have been studied with a view to improving the hue. The additional use of an auxiliary dye often results in a deterioration in waterfastness inherent in the ink or causes unfavorable phenomena, which adversely affects the reliability, such as clogging.

A variety of ink compositions, using conventional dyes and dyes having a novel structure, capable of forming prints having excellent waterfastness have been proposed in the art. However, there is still a need for an ink which can satisfactorily meet the waterfastness requirement, faithfully reproduce black color, and realize high-quality images.

SUMMARY OF THE INVENTION

We have now found that combined use of particular dyes can offer a combination of a high-quality image with a waterfast image. More specifically, we have found that a combination of particular dyes can realize an ink composition which can faithfully reproduce black color, realize a high-quality image (a sharp image having a high optical density and free from bleed) also on plain paper and, at the same time, offer rapid ink fixation and waterfastness and lightfastness of the printed image.

Accordingly, an object of the present invention is to provide an ink composition which can realize a combination of a high-quality image with a waterfast image.

Another object of the present invention is to provide an ink composition which can faithfully reproduce black color, realize a high-quality image (a sharp image having a high optical density and free from bleed) also on plain paper and, at the same time, offer quick ink fixation and waterfastness and lightfastness of the printed image.

Thus, according to a first aspect of the present invention, there is provided an ink composition comprising at least a first group of dyes and a second group of dyes, the first group of dyes comprising a dye represented by the following formula (I) wherein $R^1$ is $PO(OM)_2$ at the m-position to the azo group and a dye represented by the following formula (I) wherein $R^1$ is COOM in the m-position to the azo group,

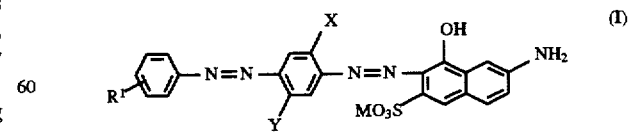

(I)

wherein $R^1$ represents $-PO(OM)_2$ or $-COOM$, X and Y each independently represent a $C_{1-4}$ alkoxy and M represents a cation of a group selected from the group consisting of a hydrogen atom, an alkali metal, ammonia, and an organic amine; and the second group of dyes comprising a dye represented by the following formula (II) and/or a dye represented by the following formula (III):

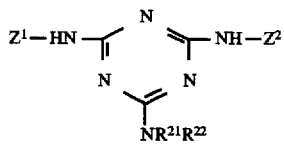

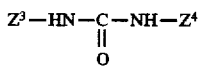

wherein $R^{21}$ and $R^{22}$ each independently represent a hydrogen atom or —$C_2H_4OH$, $Z^1$, $Z^2$, $Z^3$ and $Z^4$ each independently represent a group represented by the following formula (IV) or (V):

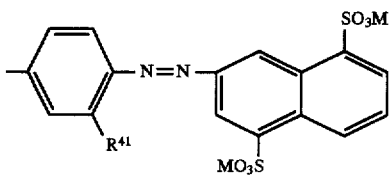

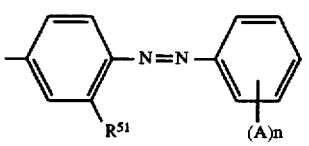

wherein $R^{41}$ and $R^{51}$ each independently represent a hydrogen atom, a $C_{1-4}$ alkyl or a $C_{1-4}$ alkoxy, A represents —$SO_3M$ or —COOM, M is as defined above and n is 1 or 2.

According to a second aspect of the present invention, there is provided an ink composition comprising a dye represented by the formula (I) defined above, wherein $R^1$ is $PO(OM)_2$ or COOM at the m-position to the azo group, and a dye represented by the following formula (VI):

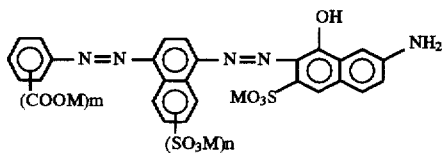

wherein M is as defined above;
m is 1 or 2;
n is 0 or 1.

According to a third aspect of the present invention, there is provided an ink composition comprising a group A of dyes and a group B of dyes,
the group A of dyes comprising a dye represented by the formula (I) defined above and a dye represented by the formula (VII) defined above,
the group B of dyes being the second group of dyes defined in claim 1.

DETAILED DESCRIPTION OF THE INVENTION

The ink composition according to the present invention is used in recording methods using an ink composition. Recording methods using an ink composition include, for example, ink jet recording, recording using a writing material, such as a pen, and other various printing methods, such as a recorder and a pen plotter. In particular, the ink composition according to the present invention is suitable for use in the ink jet recording system. Ink jet recording methods usable herein include ejection of liquid droplets by taking advantage of oscillation of piezoelectric device, a method utilizing heat energy, and other various ink jet recording methods which is currently known or will be known in the art. After printing, the ink composition according to the present invention may be dried and fixed by suitable heat fixation means, for example, hot air, heating roll or plate, infrared rays.

Ink composition according to first aspect of invention

The ink composition according to the first aspect of the present invention comprises a first group of dyes and a second group of dyes.

A combination of these two groups of dyes results in faithful reproduction of black color and, at the same time, realizes waterfast prints. Further, it enables black color to be faithfully reproduced on paper, called "plain paper," used in offices, schools, and households, such as copying paper, memo pads, bond paper, letter paper, postcards, and voucher paper, and, at the same time, can realize waterfast prints.

The ratio of the first group of dyes to the second group of dyes in the ink composition may be suitably determined in such a range as will offer the above advantages. For example, the weight ratio of the first group of dyes to the second group of dyes in the ink composition is preferably in the range of from 1:0.1 to 1:0.5.

The total amount of the dyes added to the ink composition also may be suitably determined in such an amount range as will offer the above advantages. For example, it is preferably about 1 to 25% by weight, more preferably about 2 to 10% by weight.

The first group of dyes comprises a dye represented by the formula (I) wherein $R^1$ is $PO(OM)_2$ at the m-position to the azo group and a dye represented by the formula (I) wherein $R^1$ is COOM at the m-position to the azo group.

In the formula (I), the $C_{1-4}$ alkoxy represented by X and Y is preferably a methoxy, ethoxy, or butoxy group.

Alkali metals represented by M in the formula (I) include, for example, lithium, sodium, and potassium. Organic amines represented by M include, for example, mono-, di-, or tri-lower alkyl-substituted (preferably, $C_{1-4}$ alkyl-substituted) amine, allylamine, morpholine, and piperidine. More specific examples thereof include methylamine, dimethylamine, trimethylamine, ethylamine, diethylamine, triethylamine, propylamine, isopropylamine, dipropylamine, diisopropylamine, butylamine, isobutylamine, sec-butylamine, tert-butylamine, and dibutylamine.

According to a preferred embodiment of the present invention, the weight ratio of the dye represented by the formula (I) with $R^1$ being $PO(OM)_2$ at the m-position to the azo group to the dye represented by the formula (I) with $R^1$ being COOM at the m-position to the azo group is in the range of from 1:0.6 to 1:1.5. The use of the above first group of dyes can realize an ink composition having excellent storage stability. More specifically, an ink composition free from precipitation of insolubles can be provided.

The dye, contained in the first group of dyes, represented by the formula (I) with $R^1$ being $PO(OM)_2$ at the m-position to the azo group is a disazo dye, having a phosphoric acid group, disclosed in Japanese Patent Publication No. 80956/1993. Since this dye has a phosphoric acid group in its structure, it has a high capability of dying cellulose fibers such as paper and, at the same time, excellent waterfastness. Further, this dye possesses excellent solubility in an aqueous liquid medium because it has a water-soluble acid group such as a sulfonic acid group. The solubility in water varies depending upon pH of the aqueous medium. However, good solubility is provided in pH 7.5–11, preferably pH 8.5–10, and the dye is sparingly soluble in pH on the acid side. This dye can be synthesized, for example, by the following method. Specifically, m-aminobenzenephosphonic acid is diazotated by a conventional method and subjected to coupling with 2,5-di-$C_{1-4}$ alkoxy-substituted aniline to give a monoazo compound having an amino group. The monoazo compound, after isolation or as such, is diazotated by a conventional method and subjected to coupling with γ acid (2-amino-8-naphthol-6-sulfonic acid) to give the contemplated dye.

The dye, contained in the second group of dyes, represented by the formula (I) with $R^1$ being COOM at the m-position to the azo group may be a diazo dye, having a carboxylic acid group, disclosed in Japanese Patent Laid-Open Nos. 262998/1993 and 125318/1993. Since this dye has a carboxylic acid group in its structure, it has good waterfastness. Further, since this dye has a water-soluble acid group, such as a sulfonic acid group, it dissolves as an alkali metal salt or an ammonium salt in an aqueous liquid medium. It is insoluble when the pH of the aqueous liquid medium is not more than 6. Good solubility is provided in pH 8.0–10. This dye can be synthesized, for example, by the following method. Specifically, m-aminobenzenecarboxylic acid is diazotated by a conventional method and subjected to coupling with 2,5-di-$C_{1-4}$ alkoxy-substituted aniline to give a monoazo compound having an amino group. The monoazo compound, after isolation or as such, is diazotated by a conventional method and subjected to coupling with γ acid (2-amino-8-naphthol-6-sulfonic acid) to give the contemplated dye.

Specific examples of dyes represented by the formula (I) with $R^1$ being PO(OM)$_2$ at the m-position to the azo group and dyes represented by the formula (I) with $R^1$ being COOM at the m-position to the azo group, which may be preferably used in the present invention, are as follows.

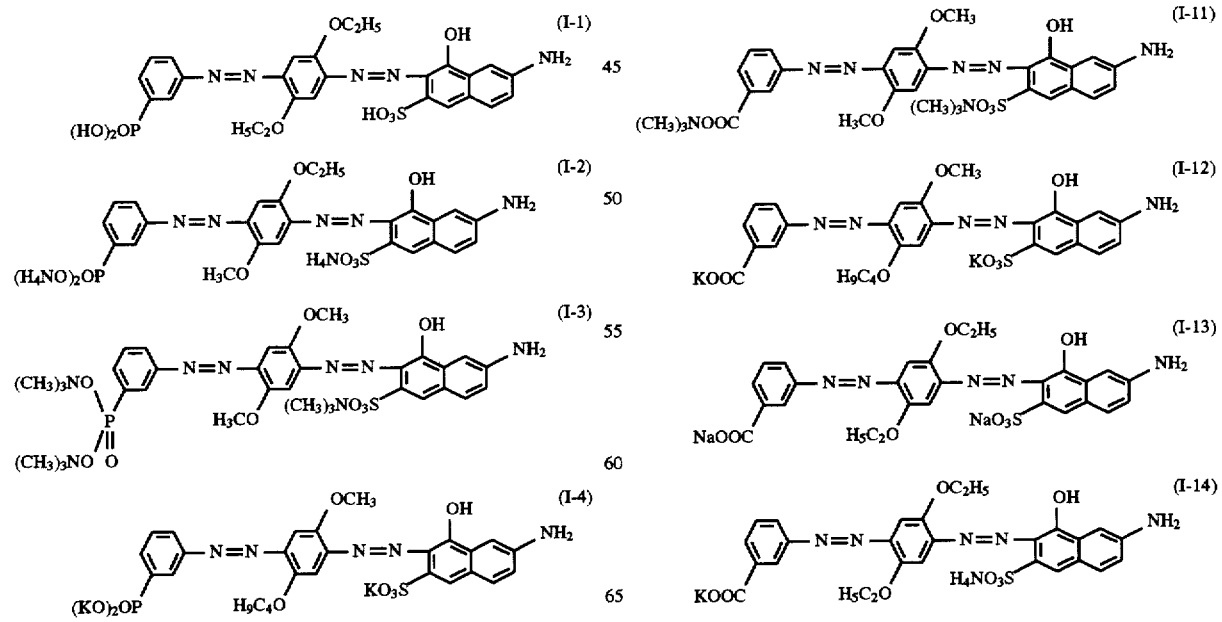

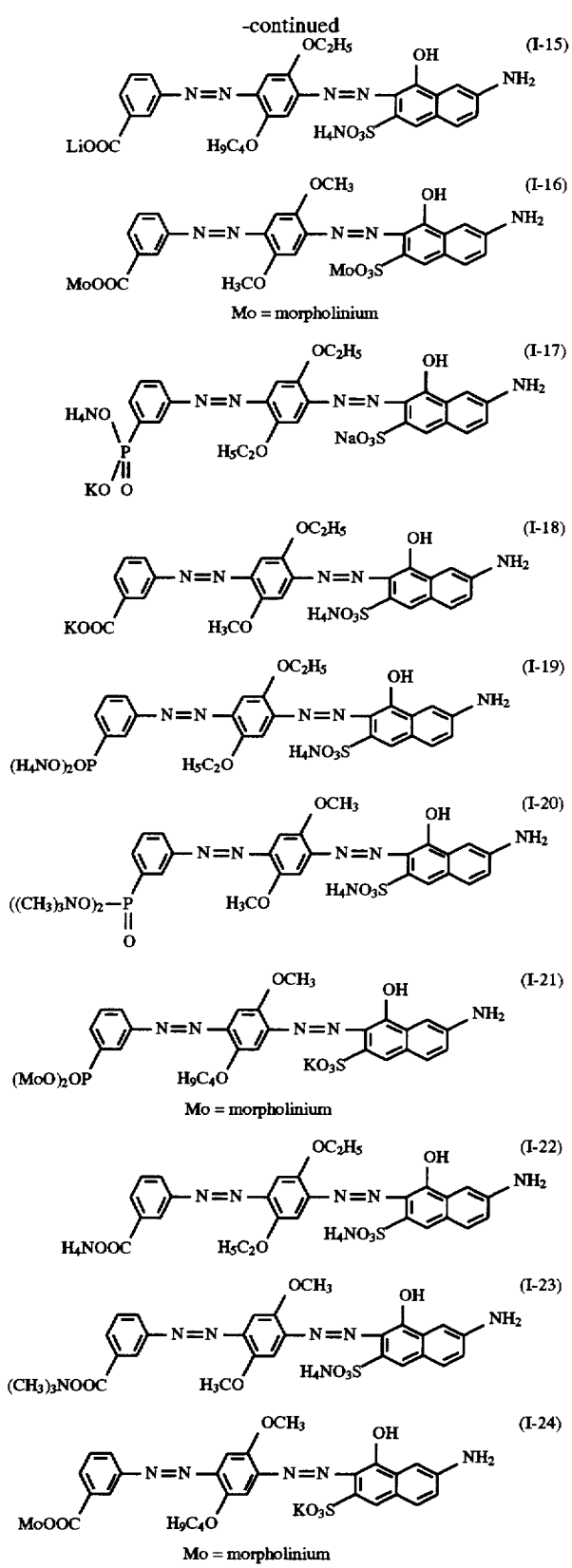

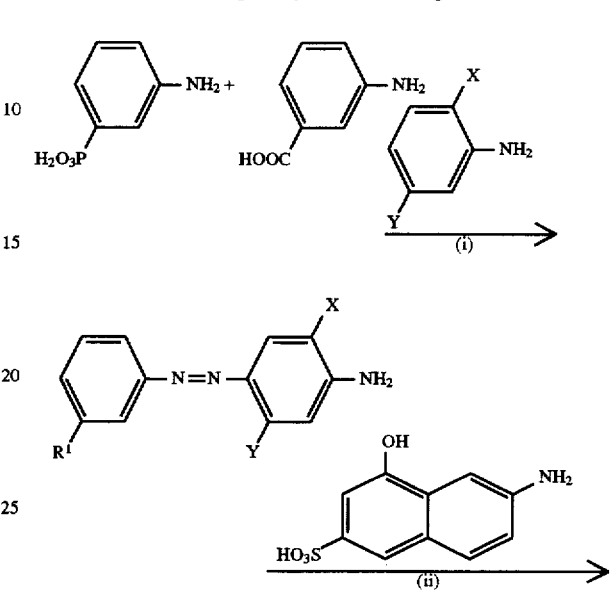

The above two dyes constituting the first group of dyes may be separately synthesized and then mixed with each other. Alternatively, they may be simultaneously synthesized as a mixture. Such simultaneous synthesis may be performed, for example, by the following scheme.

In the step (i), m-aminobenzenephosphonic acid and m-aminobenzenecarboxylic acid in the form of a mixed amine are simultaneously diazotated at a temperature of, for example, 0° to 5° C. Then, in the step (ii), the diazotated compounds are then subjected to a coupling reaction with 2,5-dialkoxy-substituted aniline, for example, at a temperature of 0° to 5° C. and pH 0.5 to 3.5. In the step (iii), the resultant monoazo compounds are diazotated, for example, at a temperature of 25° to 35° C. and then subjected to a coupling reaction with γ acid (2-amino-8-naphthol-6-sulfonic acid) at a temperature of 5° to 15° C. and pH 9 to 10.

The second group of dyes used in the first aspect of the present invention comprises a dye represented by the formula (II) and/or a dye represented by the formula (III).

The dyes of the second group of dyes are known in the art and described, for example, in Japanese Patent Laid-Open No. 233975/1992 and Color Index (THE SOCIETY OF DYES AND COLOURISTS).

Specific examples of dyes which are embraced in the second group of dyes and may be preferably used in the present invention are as follows.

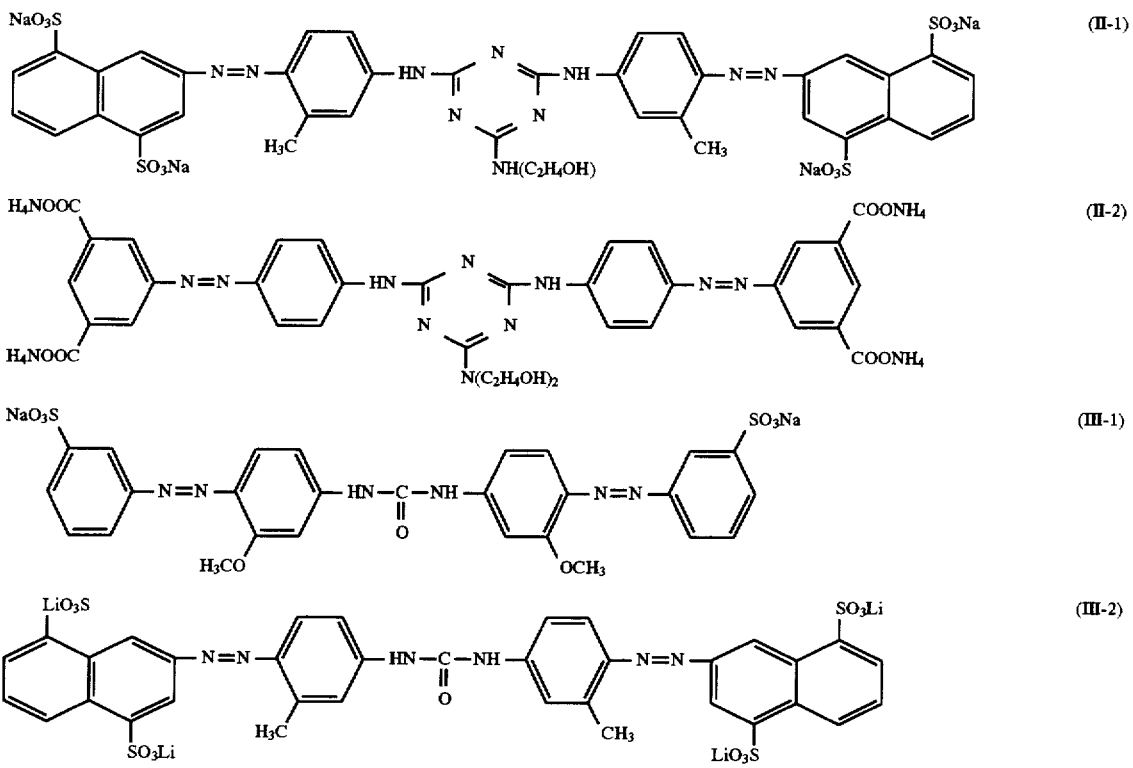

According to a preferred embodiment of the present invention, M in the formula (I) represents a cation of a volatile compound with M in the formula (II) and/or (III) being a cation of an alkali metal. This combination is preferred from the viewpoints of waterfastness of the printed image and prevention of clogging of nozzles. Volatile compounds usable herein include ammonium, methylamine, dimethylamine, trimethylamine, ethylamine, diethylamine, triethylamine, propylamine, isopropylamine, dipropylamine, diisopropylamine, butylamine, isobutylamine, sec-butylamine, tert-butylamine, dibutylamine, allylamine, morpholine, piperidine, and mixtures thereof.

The ink composition according to the first aspect of the present invention basically comprises the above groups of dyes, water, and an organic solvent.

According to a preferred embodiment of the present invention, a nitrogen-containing cyclic compound and a polyhydric alcohol as the solvent are used in combination with the above group of dyes.

The addition of the nitrogen-containing cyclic compound can stabilize the dissolution of the dyes and, at the same time, can prevent clogging of nozzles, resulting in stable printing. Further, it advantageously aids the color development of the dyes and improves the waterfastness of the printed image. The amount of the nitrogen-containing cyclic compound added is preferably about 1 to 30% by weight, more preferably 3 to 20% by weight. Specific examples of nitrogen-containing cyclic compounds usable herein include 1,3-dimethyl-2-imidazolidinone, 2-pyrrolidone, N-methyl-2-pyrrolidone, ε-caprolactam, and mixtures thereof.

The addition of the polyhydric alcohol offers an advantage that clogging of nozzles can be more effectively prevented. The amount of the polyhydric alcohol added is preferably about 1 to 30% by weight, more preferably 3 to 20% by weight. Specific examples of polyhydric alcohols usable herein include ethylene glycol, diethylene glycol, triethylene glycol, polyethylene glycol, propylene glycol, 1,3-propanediol, 1,5-pentanediol, 1,2,6-hexanetriol, glycerin, and mixtures thereof.

According to a preferred embodiment of the present invention, the ink composition according to the first aspect of the present invention comprise a nonionic acetylene glycol surfactant. The addition of nonionic acetylene glycol surfactant can advantageously offer quick fixation, i.e. penetration, of the ink and, at the same time, enables one dot to be kept circular.

Specific examples of nonionic acetylene glycol surfactants usable herein include, for example, Surfynol 465, Surfynol 104, and Olfine STG (trade names, all available from Nissin Chemical Industry Co., Ltd.). Among them, Olfine STG iS effective. The amount of the nonionic acetylene glycol surfactant added is preferably 0.05 to 3% by weight, more preferably 0.5 to 2% by weight.

According to a preferred embodiment, the ink composition according to the first aspect of the present invention contains a glycol ether. The addition of the glycol ether can further increase the penetration of the ink and, at the same time, can reduce the bleed in the boundary between adjacent color inks in color printing, offering a very sharp image.

Glycol ethers usable herein include, for example, ethylene glycol monobutyl ether, diethylene glycol monobutyl ether, triethylene glycol monoethyl ether, propylene glycol monomethyl ether, dipropylene glycol monoethyl ether, propylene glycol monobutyl ether, dipropylene glycol monobutyl ether, and triethylene glycol monobutyl ether. The amount of the glycol ether added thereto is preferably about 3 to 30% by weight, more preferably 5 to 15% by weight.

According to a preferred embodiment of the present invention, the pH of the ink composition is adjusted by the addition of tri(hydroxyalkyl)amine. The pH adjustment may be conducted by adding an inorganic base, such as KOH or NaOH, and a method using an organic base, such as an amine. In the case of an inorganic base, pH, in some cases, rapidly increases when the amount thereof exceeds a certain level, making it difficult to control the pH. Further, since the inorganic base is solid, it per se precipitates in the ink composition, causative of clogging of nozzles. Further, in the organic base, since the nitrogen atom is positively charged, there is a fear of causing a reaction with dyes. In using any of the inorganic and organic bases, care should taken so as not to cause the above problems. On the other hand, tri(hydroxyalkyl)amine is less likely to cause such problems, and, hence, the use thereof is preferred. Although the amount of the tri(hydroxyalkyl)amine added may be suitably determined by taking into consideration contemplated pH and other properties of the ink composition, it is preferably about 0.1 to 2% by weight, more preferably about 0.3 to 1% by weight.

Further, according to a preferred embodiment of the present invention, the ink composition contains the tri(hydroxyalkyl)amine in combination with at least one hydroxide of metal element selected from the group consisting of the group Ia metal elements of the periodic table. This hydroxide belongs to the above inorganic base. However, the use thereof in combination with the tri(hydroxyalkyl)amine results in further quick resumption of normal printing after clogging. Further, this combination offer an additional advantage that the occurrence of precipitate can be reduced and the pH can remain unchanged, as compared with the pH adjustment using the inorganic base alone. Preferred metal oxides include LiOH, NaOH, KOH because they have high solubility in water. The amount of the metal oxide added may be suitably determined in such an amount range as will improve the properties of the ink, particularly the quick resumption of normal printing after clogging. However, it is preferably about 0.01 to 1% by weight.

The ink composition according to the first aspect of the present invention may further comprise an additional dye(s) so far as such dye(s) is not detrimental to the effect of waterfastness and faithful reproduction of black color. Further, if necessary, water-soluble compounds, such as lower alcohols and sodium alginate, water-soluble resins, fluorosurfactants, antimolds, rust preventives and the like may be added to the ink composition.

When the ink composition according to the present invention is used in ink-jet recording, in order to realize good response, ejection stability, suitable spread of dot, and good circularity of the dot, properties of the ink composition are such that the viscosity of the ink composition is preferably not more than 30 mPa.sec, more preferably 1.2 to 20 mPa.sec, at a service temperature of 0° to 50° C., and the surface tension of the ink composition is about 20 to 35 mN/m at a service temperature of 0° to 50° C.

The ink composition according to one aspect of the present invention can be prepared by a conventional method. For example, necessary ingredients are thoroughly mixed together and dissolved in one another, and the solution is filtered through a membrane filter having a pore diameter of about 0.8 μm and deaerated by means of a vacuum pump to prepare an ink.

Ink composition according to second aspect of invention

The ink composition according to the second aspect of the present invention comprises a dye represented by the formula (I), wherein $R^1$ is $PO(OM)_2$ or COOM at the m-position to the azo group, and a dye represented by the above formula (VI).

A combination of these two groups of dyes results in faithful reproduction of black color and, at the same time, realizes waterfast prints.

Further, it enables black color to be faithfully reproduced on paper, called "plain paper," used in offices, schools, and households, such as copying paper, memo pads, bond paper, letter paper, postcards, and voucher paper, and, at the same time, can realize waterfast prints.

The ratio of the dye represented by the formula (I) to the dye represented by the formula (VI) in the ink composition may be suitably determined in such a range as will offer the above advantages. For example, the weight ratio of the dye represented by the formula (I) to the dye represented by the formula (VI) in the ink composition is in the range of from 4:1 to 1:10, more preferably 3:1 to 1:5.

The amount of the dyes added to the ink composition also may be suitably determined in such an amount range as will offer the above advantages. For example, it is preferably about 1 to 20% by weight, more preferably about 2.5 to 10% by weight.

Dyes, represented by the formula (I), used in the ink composition according to the second aspect of the present invention may be as defined above in connection with the ink composition according to the first aspect of the present invention. Further, preferred specific examples thereof may also be the same as those described above in connection with the ink composition according to the first aspect of the present invention. Therefore, they include the above dyes (I-1) to (I-24). Further, in the second aspect of the present invention, the dye represented by the formula (I) may be any of the dye represented by the formula (I) with $R^1$ being $PO(OM)_2$ at the m-position to the azo group and the dye represented by the formula (I) with $R^1$ being COOM at the m-position to the azo group.

According to a preferred embodiment of the present invention, M in the formula (I) is preferably a volatile alkali salt, such as ammonium, substituted ammonium, morpholinium, or piperidinium, because the waterfastness of the printed image can be improved. Examples of amines usable in the formation of such salts include methylamine, dimethylamine, trimethylamine, ethylamine, diethylamine, triethylamine, propylamine, isopropylamine, dipropylamine, diisopropylamine, butylamine, isobutylamine, sec-butylamine, tert-butylamine, dibutylamine, allylamine, morpholine, piperidine, and mixtures thereof. In this connection, it should be noted that the dye represented by the formula (I) may not be completely in the form of ammonium salt, substituted ammonium salt, morpholinium salt, or piperidinium salt and may be a mixture of such salt with an alkali metal salt. In this case, the amount of the alkali metal salt is preferably not more than 50% based on the whole dye.

The dyes represented by the formula (VI) used in the second aspect of the present invention are known dyes described in U.S. Pat. Nos. 4,963,189 and 5,203,912.

Examples of preferred dyes, represented by the formula (VI), usable herein are as follows.

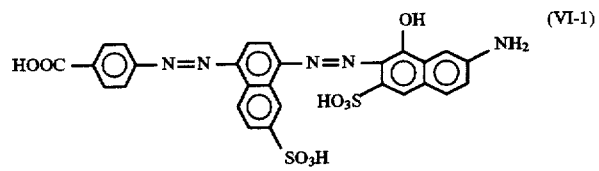

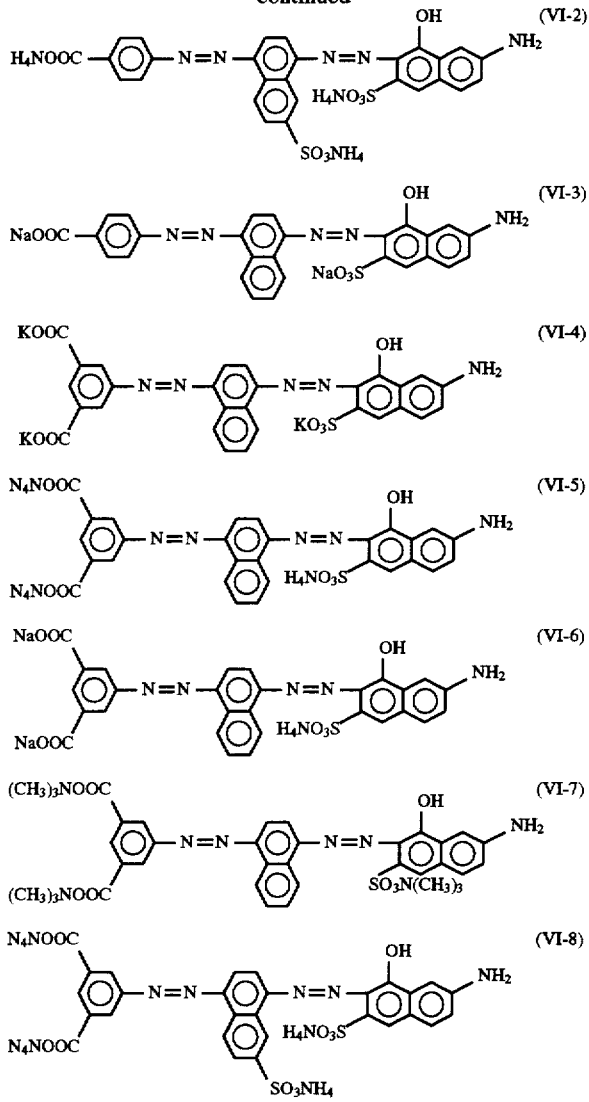

As described above, the dyes represented by the formula (VI) are described in U.S. Pat. Nos. 4,963,189 and 5,203,912. Therefore, they may be prepared by reference to the description of these U.S. patents. Further, they may be prepared by the methods described in Japanese Patent Laid-Open No. 140270/1990 and Color Index, Third Edition, The Society of Dyers and Colourists.

As is known from Japanese Patent Publication No. 80956/1993, Japanese Patent Laid-Open Nos. 262998/1993 and 125318/1993, U.S. Patent Nos. 4,963,189 and 5,203,912, the ink composition, to which the dyes represented by the formulae (I) and (VI) are added, should be basic in order to dissolve them. Therefore, the ink composition of the present invention also is preferably adjusted to pH on the basic side. According to a preferred embodiment, the pH value of the ink composition is preferably in the range of from 8.5 to 11, more preferably in the range of from 8.5 to 10.

The ink composition according to this aspect of the present invention comprises the above group of dyes, water, and an organic solvent.

According to a preferred embodiment, the addition of a glycol ether is preferred from the viewpoint of offering rapid fixation, i.e. penetration, of the ink and, at the same time, preventing the occurrence of bleed in color printing. Specific examples of glycol ethers usable herein include ethylene glycol monobutyl ether, diethylene glycol monobutyl ether, triethylene glycol monobutyl ether, propylene glycol monoethyl ether, propylene glycol monomethyl ether, dipropylene glycol monoethyl ether, propylene glycol monobutyl ether, dipropylene glycol monobutyl ether, and triethylene glycol monobutyl ether. The amount of the glycol ether added may be suitably determined in such an amount range as will provide the effect of the penetration of the ink and preventing the bleed. Since, however, the dyes represented by the formula (I) and the dyes represented by the formula (IV) are sparingly soluble or insoluble in the glycol ether, the addition thereof in an excessive amount leads to a fear of clogging of nozzles. Therefore, the amount of these dyes added is preferably about 3 to 30% by weight, more preferably about 5 to 15% by weight.

In the ink composition according to the second aspect of the present invention, the addition of a nonionic acetylene glycol surfactant is preferred for the same reason as described above in connection with the ink composition according to the first aspect of present invention. Specific examples of nonionic acetylene glycol surfactants usable herein include those described above in connection with the ink composition according to the first aspect of present invention. Although the amount of the nonionic acetylene glycol surfactant added may be suitably determined, it is preferably about 0.05 to 5% by weight, more preferably about 0.1 to 2% by weight.

For the same reason as described above in connection with the first aspect of the invention, the pH value of the ink composition according to this aspect of the invention is adjusted by the addition of the tri(hydroxyalkyl)amine. The amount of the tri(hydroxyalkyl)amine added may be the same as that described above in connection with the first aspect of the invention.

Further, for the same reason as described above in connection with the first aspect of the invention, the ink composition according to this aspect of the invention preferably contains the tri(hydroxyalkyl)amine in combination with at least one hydroxide of metal element selected from the group consisting of the group Ia elements of the periodic table. The amount of the metal element added may be the same as that described above in connection with the first aspect of the invention.

As with the ink composition according to the first aspect of the invention, the ink composition according to this aspect of the present invention may further contain an additional dye(s) so far as the addition thereof is not detrimental to the effect of waterfastness and reproduction of black color. Further, if necessary, water-soluble compounds, such as lower alcohols and sodium alginate, water-soluble resins, fluorosurfactants, antimolds, rust preventives and the like may be added to the ink composition.

When the ink composition according to the present invention is used in ink-jet recording, it preferably has the same viscosity and surface tension as described above in connection with the ink composition according to the first aspect of the invention.

The ink composition according to this aspect of the present invention may be prepared by the same method as described above in connection with the first aspect of the invention.

Ink composition according to third aspect of invention

The ink composition according to the third aspect of the invention comprises two kinds of dyes, a group A of dyes and a group B of dyes.

A combination of these two groups of dyes results in faithful reproduction of black color and, at the same time, realizes waterfast prints. Further, it enables black color to be faithfully reproduced on copying paper, called "plain paper," used in offices, schools, and households, such as copying paper, memo pads, bond paper, letter paper, postcards, and voucher paper, and, at the same time, can realize waterfast prints.

The ratio of the group A of dyes to the group B of dyes in the ink composition may be suitably determined in such a ratio range as will offer the above advantages. For example. However, it is preferably in the range of from 1:0.1 to 1:0.5 in terms of weight ratio.

The total amount of the dyes added to the ink composition also may be suitably determined in such an amount range as will offer the above advantages. For example, it is preferably about 1.5 to 25% by weight, more preferably about 3 to 15% by weight.

In the ink composition according to this aspect of the invention, the group A of dyes comprise a dye represented by the above formula (I) and a dye represented by the above formula (VI).

Dyes, represented by the formula (I), used in the ink composition according to this aspect of the invention may be as defined above in connection with the ink composition according to the first aspect of the invention. In this aspect of the invention, in the dyes represented by the formula (I), although the position of the substituent $R^1$ is not particularly limited, preferred are dyes where $R^1$ is $PO(OM)_2$ or COOM at the m-position to the azo group. Specific examples of preferred dyes may be the same as those described above in connection with the first aspect of the invention. Therefore, they include the above dyes (I-1) to (I-24).

According to a preferred embodiment of the invention, the ink composition of this aspect of the invention comprises the dye represented by the formula (I) and the dye represented by the formula (VI) in a weight ratio of 4:1 to 1:10 with the weight ratio being more preferably 3:1 to 1:5. When the weight ratio is in the above range, the dissolution of the group A of dyes in an aqueous medium can be improved and, at the same time, the dissolution stability can be improved.

The amount of the group A of dyes added to the ink composition may be suitably determined. For example, it is preferably about 1 to 20% by weight, more preferably about 2.5 to 10% by weight.

In this aspect of the invention, the group B of dyes are as defined above in connection with the second group of dyes in the first aspect of the invention. Specifically, the group B of dyes comprises a dye represented by the formula (II) and/or a dye represented by the formula (III). Specific examples of preferred dyes may be the same as those described above in connection with the first aspect of the invention. Therefore, they include the above dyes (II-1), (II-2), (III-1), and (III-2).

As with the ink composition according to the first aspect of the invention, in this aspect of the invention, preferably, M in the formula (I) represents a cation of a volatile compound with M in the formula (II) and/or (III) being a cation of an alkali metal. As described above, this combination is preferred from the viewpoints of waterfastness of the printed image and prevention of clogging of nozzles. The volatile compounds may be the same as those described above in connection with the first aspect of the invention.

The ink composition according to this aspect of the invention basically comprises the above groups of dyes, water, and an organic solvent.

For the same reason as described above in connection with the first aspect of the invention, in this aspect of the invention, a nitrogen-containing cyclic compound and a polyhydric alcohol as the solvent are used in combination with the above group of dyes. Specific examples and the amount of the nitrogen-containing cyclic compounds and polyhydric alcohols added may be the same as those described above in connection with the ink composition according to the first aspect of the invention.

In the ink composition according to the third aspect of the present invention, the addition of a nonionic acetylene glycol surfactant is preferred for the same reason as described above in connection with the ink composition according to the first aspect of the invention. Specific examples and the amount of the nonionic acetylene glycol surfactant added may be the same as those described above in connection with the ink composition according to the first aspect of the invention.

Further, for the same reason as described above in connection with the ink composition according to the first aspect of the invention, the ink composition according to this aspect of the invention preferably contains a glycol ether. Specific examples and the amount of the glycol ether added may be the same as those described above in connection with the ink composition according to the first aspect of the invention.

For the same reason as described above in connection with the first aspect of the invention, the pH value of the ink composition according to this aspect of the invention is adjusted by the addition of the tri(hydroxyalkyl)amine. The amount of the tri(hydroxyalkyl)amine added may be the same as that described above in connection with the first aspect of the invention.

Further, for the same reason as described above in connection with the first aspect of the invention, the ink composition according to this aspect of the invention preferably contains the tri(hydroxyalkyl)amine in combination with at least one hydroxide of metal element selected from the group consisting of the group Ia elements of the periodic table. The amount of the metal hydroxide may be the same as that described above in connection with the first aspect of the invention.

As with the ink composition according to the first aspect of the invention, the ink composition according to the third aspect of the invention may further contain an additional dye(s) so far as the addition thereof is not detrimental to the effect of waterfastness and reproduction of black color. Further, if necessary, water-soluble compounds, such as lower alcohols and sodium alginate, water-soluble resins, fluorosurfactants, antimolds, rust preventives and the like may be added to the ink composition.

When the ink composition according to the present invention is used in ink-jet recording, it preferably has the same viscosity and surface tension as described above in connection with the ink composition according to the first aspect of the invention.

The ink composition according to this aspect of the present invention may be prepared by the same method as described above in connection with the first aspect of the invention.

EXAMPLES

The present invention will be described in more detail with reference to the following examples, though it is not limited to these examples only. Further, the dye numbers cited below correspond to the dye numbers defined above.

Example A

Synthesis of dye (I-1)

m-Aminobenzenephosphonic acid (34.62 g (0.20 mol)) was suspended in 400 ml of water with stirring, 30.4 g (0.29 mol) of 35% hydrochloric acid was added thereto, and the mixture was cooled to 0° C. To this solution was dropwise added 40.0 g (0.21 mol) of a 36% sodium nitrite solution with caution so as for the temperature of the solution not to exceed 5° C. The mixture was then stirred for 50 min, thereby diazotating the mixed amine. Thereafter, thiourea was added to the resultant reaction mixture to remove excess nitric acid, thereby preparing a diazo component-containing liquid. Separately, 36.3 g (0.22 mol) of 2,5-diethoxyaniline was dispersed in 500 ml of water, and 21.3 g (0.21 mol) of 35% hydrochloric acid was added to and dissolved in the dispersion to prepare a coupling component-containing liquid. The coupling component-containing liquid was cooled to 0° C., and the diazo component-containing liquid was dropwise added thereto so that the temperature of the system did not exceed 5° C. The mixture was stirred for 20 hr at 3° to 5° C. to prepare a mixture containing a monoazo compound (m-(2,5-diethoxy-4-amino-phenylazo) benzenephosphonic acid).

The monoazo compound mixture thus obtained was dispersed in 900 ml of water, and 43.0 g (0.48 mol) of a 45% sodium hydroxide solution was added to and dissolved in the dispersion. A 36% aqueous sodium nitrite solution (38.5 g (0.20 mol)) was added to the resultant solution. The mixture was cooled to 25° C., and 130 g (0.71 mol) of 20% hydrochloric acid was gradually added thereto so that the temperature of the system did not exceed 30° C., followed by stirring for 3 hr at 25° to 30° C. or below to diazotate the monoazo compound mixture. Thereafter, sulfamic acid was added to the resultant aqueous solution to remove excess nitric acid, thereby preparing a diazo component liquid.

γ Acid (51.6 g (0.21 mol) was added to 600 ml of water, 37.0 g (0.42 mol) of a 45% aqueous sodium hydroxide solution was dissolved therein, and the solution was cooled to 5° C. to prepare a coupler solution. The diazo component-containing liquid of monoazo compound prepared above was dropwise added to the coupler solution so that the reaction temperature did not exceed 8° C., during which time the pH of the reaction mixture was adjusted to 8.5 by the addition of a 20% aqueous sodium hydroxide solution. Thereafter, the reaction mixture was stirred at 8° C. for additional 3 hr, followed by salting-out/acidification to give about 80 g of a disazo dye, a dye represented by the formula (I-1).

Synthesis of dye (I-9)

A disazo dye (about 70 g), a dye represented by the formula (I-9), was prepared in the same manner as described above in connection with the preparation of dye (I-1), except that 27.40 g (0.20 mol) of m-aminobenzenecarboxylic acid was used.

Preparation of ink composition

Ink compositions listed in the following table were prepared. Specifically, all the ingredients were mixed together, and the mixture was stirred for one hr at 70° C. and then self-cooled while continuing the stirring. When the temperature reached 40° C. or below, the mixture was filtered by a 0.8-μm membrane filter under reduced pressure to prepare a contemplated ink.

In the following table, the ink compositions of the examples are ink compositions according to the first embodiment of the present invention. The numerical values in the table are in % by weight, and the balance of the composition consisted of water.

TABLE 1

| Ink composition | | Example | | | | | | | |
|---|---|---|---|---|---|---|---|---|---|
| | | A1 | A2 | A3 | A4 | A5 | A6 | A7 | A8 |
| 1st group of dyes | I-1 | 3.6 | | 4.0 | 2.4 | | | | 3.6 |
| | I-2 | | 3.0 | | | | 4.0 | 1.5 | |
| | I-5 | | | | | 4.0 | | | |
| | I-9 | 2.4 | | 2.4 | 3.6 | | | | 2.4 |
| | I-10 | | 3.5 | | | | 2.5 | 1.5 | |
| | I-13 | | | | | 2.5 | | | |
| 2nd group of dyes | II-1 | 1.2 | 1.0 | | | | | | 1.0 |
| | II-2 | | 0.5 | | | 2.0 | 2.0 | | 1.5 |
| | III-1 | | | 1.5 | 1.5 | | | | |
| | III-2 | | | | | | | 1.0 | |
| Diethylene glycol | | | 5 | 8 | 8 | 5 | 5 | | 5 |
| Polyethylene glycol #200 | | | | | | 5 | | | |
| 1,5-Pentanediol | | | | | | 5 | 10 | | |
| Glycerin | | 5 | 3 | 2 | 2 | | | 10 | 3 |
| 2-Pyrrolidone | | 5 | 5 | | | 5 | 5 | 5 | 3 |
| 1,3-Dimethyl-2-imidazolidinone | | | | 4 | 4 | | | | |
| Diethylene glycol monobutyl ether | | 10 | 10 | | | | | | 10 |
| Triethylene glycol monobutyl ether | | | | 10 | 10 | | | 5 | |
| Propylene glycol monobutyl ether | | | | | | 10 | 10 | | |
| Surfynol 465 | | | | 1 | 1 | | | 0.1 | |
| Olfine STG | | 1 | 1 | | | 0.8 | 0.8 | | 0.05 |
| Triethanolamine | | 0.8 | 0.9 | 0.5 | 0.5 | | | 0.9 | 0.8 |
| Potassium hydroxide | | | 0.1 | | | | 0.1 | 0.1 | |
| 1-Propanol | | | | | | | | 3 | |
| Sodium alginate | | | | | | | | 0.01 | |
| Proxel XL-2 | | 0.3 | 0.3 | 0.3 | 0.3 | 0.3 | 0.3 | 0.3 | 0.3 |
| pH of ink | | 9.2 | 9.5 | 8.7 | 8.6 | 8.0 | 8.8 | 9.8 | 8.6 |
| Surface tension of ink (mN/m) | | 26 | 26 | 29 | 29 | 28 | 28 | 35 | 36 |
| 1st Dye:2nd Dye | | 1:0.20 | 1:0.23 | 1:0.23 | 1:0.25 | 1:0.31 | 1:0.31 | 1:0.33 | 1:0.42 |

In the table, dyes (I-1) and (I-9) were added as an ammonium salt to the ink compositions. Proxel XL-2 is an antimold prepared by ZENECA.

Print evaluation tests

In the following print evaluation tests, inks of Example A and inks of Comparative Example A were filled into a black ink cartridge for an ink jet printer MJ-700 V2/C (manufactured by Seiko Epson Corporation), and the following tests 1 to 6 were performed.

The following five kinds of paper were used for the evaluation of printed images. Papers (1) to (4) are the so-called "plain paper," and paper (5) is a specialty paper (coat paper) for an ink jet printer.

(1) EPP paper (Epson Hanbai Corporation)

(2) Xerox P (Fuji Xerox Co., Ltd.)

(3) Xerox 4024 (Xerox Co.)

(4) Ricopy 6200 (Ricoh Co., Ltd.)

(5) EPSON FINE paper (Epson Hanbai Corporation)

Test 1: Reproduction of black color

Graphics were printed on the above test paper, and the hue (spectral characteristics: L*a*b*) of the blotted image area was measured. The color difference ($\Delta E$) was determined using a black color sample, indicated in "Test Chart No. 5, The Society of the Electrophotography of Japan" (1988), as a standard color.

In the measurement of the hue, the spectral characteristics in the wavelength region of 350 to 750 nm were measured with a Macbeth spectrophotometer CE-7000 manufactured by Mcbeth. Based on the measured spectral characteristics, the color difference ($\Delta E$) was determined by the following equation:

$$\Delta E = [(\Delta L^*)^2 + (\Delta a^*)^2 + (\Delta b^*)^2 + (\Delta b^*)^2]^{1/2}$$

wherein $\Delta L^*$ represents the difference in lightness (L*) between the standard color and the blotted image area and $\Delta a^*$ and $\Delta b^*$ represent the difference in chromaticity (a*, b*) between the standard color and the blotted image area.

The reproduction of black color was evaluated in terms of the $\Delta E$ value according to the following criteria.

⊚: $\Delta E \leq 1$

○: $1 < \Delta E < 3$

△: $3 \leq \Delta E < 5$

X: $\Delta E \geq 5$

Test 2:

2-1: Image quality

Alphanumeric characters and graphics were printed on the above test paper, and the image quality was evaluated by visual inspection and by measuring the optical density (OD value) of the blotted image area according to the following criteria.

As the OD value, the reflection density was measured with Macbeth TR-927 manufactured by Macbeth.

⊚: Free from any feathering, and OD value of less than 1.30

○: Slight feathering without detrimental to image, and OD value of not less than 1.25

△: No significant feathering, but OD value of less than 1.25

X: OD value of less than 1.20

2-2: Bleed

The black ink, together with a color ink provided in an ink jet printer MJ-700 V2/C, was used for color printing, and the print was visually inspected for bleed in the boundary between the black area and the color area. The results were evaluated according to the following criteria.

⊚: Free from bleed, and sharp

○: Slight bleed, but sharp

△: Somewhat conspicuous bleed

X: Remarkable bleed

Test 3: Waterfastness

Alphanumeric characters were printed on the test paper (1) and (2). Drops of water were placed on the print samples, and the wetted print samples were then air-dried, followed by observation of the state of the dried print samples. The results were evaluated according to the following criteria.

⊚: No change from the initial state

○: Slight dissolution of dye with characters being still legible

△: Blurring observed with characters being still legible.

X: Characters blurred and illegible

Test 4: Resumption of normal printing after clogging

The ink was filled into the print head of the printer, and the print head was allowed to stand at 40° C. for one month with the position of the cap deviated from the normal position. Thereafter, the number of times of cleaning operation necessary for resuming normal printing was determined. The criteria of the evaluation were as follows.

⊚: 0 to 2 times

○: 3 to 4 times

△: 5 to 10 time

X: Not resumable even after 10-times cleaning

Test 5: Drying speed

At given period of time after printing, the printed image was rubbed with the edge of the same type of paper as the recording medium and then visually inspected for smearing of the image. The results were evaluated according to the following criteria.

⊚: Not smeared when rubbed immediately after printing

○: Not smeared when rubbed 10 sec after printing

X: Smeared when rubbed 10 sec after printing

Test 6: Storage stability

The ink was filled into an ink cartridge of the printer and allowed to stand at –30° C. and 70° C. for two weeks. Before and after standing, the ink was visually inspected for a change in properties and tone and precipitation of insolubles during standing. The results were evaluated as follows.

○: Neither a change in properties and tone nor occurrence of precipitate observed.

X: A change in properties or tone or occurrence of precipitate observed.

The evaluation results in tests 1 to 6 are summarized in the following table.

TABLE 2

| Test | | Ink Test paper | A1 | A2 | A3 | A4 | A5 | A6 | A7 | A8 |
|---|---|---|---|---|---|---|---|---|---|---|
| 1. | Reproduction of black | (1) | ⊚ | ⊚ | ⊚ | ⊚ | ⊚ | ⊚ | ⊚ | ⊚ |
| | | (2) | ⊚ | ⊚ | ⊚ | ⊚ | ⊚ | ⊚ | ⊚ | ⊚ |
| | | (3) | ⊚ | ⊚ | ⊚ | ⊚ | ⊚ | ⊚ | ⊚ | ⊚ |
| | | (4) | ⊚ | ⊚ | ⊚ | ⊚ | ⊚ | ⊚ | ⊚ | ⊚ |
| | | (5) | ⊚ | ⊚ | ⊚ | ⊚ | ⊚ | ⊚ | ⊚ | ⊚ |
| 2-1. | Quality of image | (1) | ⊚ | ⊚ | ⊚ | ⊚ | ⊚ | ⊚ | ⊚ | ⊚ |
| | | (2) | ⊚ | ⊚ | ⊚ | ⊚ | ⊚ | ⊚ | ⊚ | ⊚ |
| | | (3) | ⊚ | ⊚ | ⊚ | ⊚ | ⊚ | ⊚ | ⊚ | ⊚ |
| | | (4) | ⊚ | ⊚ | ⊚ | ⊚ | ⊚ | ⊚ | ⊚ | ⊚ |
| | | (5) | ⊚ | ⊚ | ⊚ | ⊚ | ⊚ | ⊚ | ⊚ | ⊚ |
| 2-2. | Bleed | (1) | ⊚ | ⊚ | ⊚ | ⊚ | ⊚ | ⊚ | ⊚ | △ |
| | | (2) | ⊚ | ⊚ | ⊚ | ⊚ | ⊚ | ⊚ | ⊚ | ○ |
| | | (3) | ⊚ | ⊚ | ⊚ | ⊚ | ⊚ | ⊚ | ⊚ | ○ |
| | | (4) | ⊚ | ⊚ | ⊚ | ⊚ | ⊚ | ⊚ | ○ | △ |
| | | (5) | ⊚ | ⊚ | ⊚ | ⊚ | ⊚ | ⊚ | ⊚ | ⊚ |
| 3. | Waterfastness | (1) | ○ | ○ | ○ | ○ | ○ | ○ | ○ | ○ |
| | | (2) | ○ | ○ | ○ | ○ | △ | ○ | ○ | ○ |
| 4. | Resumption after clogging | | ⊚ | ⊚ | ⊚ | ⊚ | △ | ○ | ⊚ | ⊚ |
| 5. | Drying speed | | ⊚ | ⊚ | ⊚ | ⊚ | ⊚ | ⊚ | ⊚ | ⊚ |
| 6. | Storage stability | | ○ | ○ | ○ | ○ | ○ | ○ | ○ | ○ |

Example B

Ink compositions listed in the following table were prepared in the same manner as in Example A.

TABLE 3

| | | B1 | B2 | B3 | B4 | B5 | B6 |
|---|---|---|---|---|---|---|---|
| Dye 1 | I-1 | 3 | | | 10 | | 3 |
| | I-2 | | 0.5 | 0.5 | | 0.5 | |
| | I-9 | | 0.5 | 0.5 | | 0.5 | |
| Dye 2 | VI-9 | | 1 | 1 | | 1 | |
| | VI-22 | 3 | | | 10 | | 3 |
| Glycerin | | 10 | | | 10 | | 10 |
| Ethylene glycol | | 5 | | | 5 | | 5 |
| Diethylene glycol | | | 2 | 2 | | | |
| 1,3-Propanediol | | | 4 | 4 | | | |
| 2-Pyrrolidone | | 3 | | | 3 | 6 | 3 |
| Triethanolamine | | 1 | | 0.3 | | 0.3 | |
| Tri-isopropanolamine | | | | | 2 | | 2 |
| Diethylene glycol monobutyl ether | | 15 | | | 15 | | 15 |
| Olfine STG | | 0.6 | | | 0.6 | | 0.6 |
| KOH | | | | | | | 1 |
| LiOH | | 0.3 | | | | 0.01 | |
| Ethanol | | | 6 | 6 | | 3 | |
| Proxel XL-2 | | 0.3 | 0.3 | 0.3 | 0.3 | 0.3 | 0.3 |
| pH of ink | | 9.1 | 8.3 | 8.5 | 10.8 | 8.6 | 11.0 |
| Surface tension of ink (mN/m) | | 30 | 52 | 52 | 30 | 48 | 30 |
| Ratio of dyes | I:VI | 1:1 | 1:1 | 1:1 | 1:1 | 1:1 | 1:1 |

In the table, dyes (I-1) and (I-9) were added as an ammonium salt to the ink compositions.

Print evaluation tests

With the above inks of Example B, Tests 1 to 6 described above were conducted. The results are summarized in the following table.

TABLE 4

| Test | | Ink Test paper | B1 | B2 | B3 | B4 | B5 | B6 |
|---|---|---|---|---|---|---|---|---|
| 1. | Reproduction of black | (1) | Δ | Δ | Δ | Δ | Δ | Δ |
| | | (2) | Δ | Δ | Δ | Δ | Δ | Δ |
| | | (3) | Δ | Δ | Δ | Δ | Δ | Δ |
| | | (4) | Δ | Δ | Δ | Δ | Δ | Δ |
| | | (5) | ⊚ | ⊚ | ⊚ | ⊚ | ⊚ | ⊚ |
| 2-1. | Quality of image | (1) | ⊚ | ○ | ○ | ⊚ | ○ | ⊚ |
| | | (2) | ⊚ | ○ | ○ | ⊚ | ○ | ⊚ |
| | | (3) | ⊚ | ○ | ○ | ⊚ | ○ | ⊚ |
| | | (4) | ⊚ | ○ | ○ | ⊚ | ○ | ⊚ |
| | | (5) | ⊚ | ⊚ | ⊚ | ⊚ | ⊚ | ⊚ |
| 2-2. | Bleed | (1) | ⊚ | ○ | ○ | ⊚ | ○ | ⊚ |
| | | (2) | ⊚ | ○ | ○ | ⊚ | ○ | ⊚ |
| | | (3) | ⊚ | ○ | ○ | ⊚ | ○ | ⊚ |
| | | (4) | ⊚ | ○ | ○ | ⊚ | ○ | ⊚ |
| | | (5) | ⊚ | ⊚ | ⊚ | ⊚ | ⊚ | ⊚ |
| 3. | Waterfastness | (1) | ⊚ | ○ | ○ | ⊚ | ○ | ⊚ |
| | | (2) | ⊚ | ○ | ○ | ⊚ | ○ | ⊚ |
| 4. | Resumption after clogging | | ⊚ | ⊚ | ⊚ | ⊚ | ○ | ○ |
| 5. | Drying speed | | ⊚ | ⊚ | ⊚ | ⊚ | ⊚ | ⊚ |
| 6. | Storage stability | | ○ | ○ | ○ | ○ | ○ | ○ |

Example C

The ink compositions listed in the following table were prepared in the same manner as in Example A.

TABLE 5

| Ink composition | | | C1 | C2 | C3 | C4 | C5 | C6 | C7 | C8 |
|---|---|---|---|---|---|---|---|---|---|---|
| Group A of dyes | I | I-19 | 3.6 | | | | 2.0 | | 0.5 | 3.6 |
| | | I-5 | | 3.0 | | 1.5 | | 1.0 | | |
| | | I-6 | | | | | | | | |
| | | I-22 | | | 0.5 | | 2.0 | | 0.3 | |
| | | I-13 | | | | 1.5 | | 0.5 | | |
| | | I-14 | | | | 3.0 | | | | |
| | VI | VI-2 | 2.4 | | | | | | | 2.4 |
| | | VI-5 | | | 5.0 | | 2.0 | | 1.6 | |
| | | VI-6 | | 1.2 | | | | 4.5 | | |
| Group B of dyes | | II-1 | 1.2 | | | | | 2.0 | | 1.0 |
| | | II-2 | | 0.6 | | | | 1.0 | | 1.4 |
| | | III-1 | | | | 1.5 | 2.2 | | | |
| | | III-2 | | | 2.2 | | | | 1.2 | |
| Diethylene glycol | | | | 5 | 8 | 5 | 2 | 5 | | 5 |
| Polyethylene glycol #200 | | | | | | 5 | | | | |
| 1,5-Pentanediol | | | | | | 5 | | 10 | | |
| Glycerin | | | 5 | 3 | 2 | | 10 | | 10 | 3 |
| 2-Pyrrolidone | | | 5 | 5 | | 5 | 4 | 5 | 5 | 3 |
| 1,3-Dimethyl-2-imidazolidinone | | | | | | 4 | | | | |
| Diethylene glycol monobutyl ether | | | 10 | 10 | | | 10 | | | 10 |
| Triethylene glycol monobutyl ether | | | | | 10 | | | | 5 | |
| Propylene glycol monobutyl ether | | | | | | 10 | | 10 | | |
| Surfynol 465 | | | | | 1 | | | | 0.1 | |
| Olfine STG | | | 1 | 1 | | 0.8 | 0.8 | 0.8 | | 0.05 |
| Triethanolamine | | | 0.8 | 0.9 | 0.5 | 0.5 | 0.3 | | 0.9 | 0.8 |
| Potassium hydroxide | | | 0.1 | 0.1 | 0.2 | 0.1 | 0.1 | 0.1 | 0.1 | |
| 1-Propanol | | | | | | | | | 3 | |
| Sodium alginate | | | | | | | | | 0.01 | |
| Proxel XL-2 | | | 0.3 | 0.3 | 0.3 | 0.3 | 0.3 | 0.3 | 0.3 | 0.3 |
| pH of ink | | | 9.5 | 9.8 | 10.5 | 9.0 | 9.3 | 8.8 | 9.8 | 8.6 |

TABLE 5-continued

| Ink composition | Example | | | | | | | |
|---|---|---|---|---|---|---|---|---|
| | C1 | C2 | C3 | C4 | C5 | C6 | C7 | C8 |
| Surface tension of ink (mN/m) | 26 | 26 | 29 | 29 | 28 | 28 | 35 | 36 |
| Ratio of dyes  I:VI | 1.5:1 | 4:1 | 1:10 | 1:1 | 2:1 | 1:3 | 1:4 | 1.5:1 |
| A:B | 1:0.2 | 1:0.1 | 1:0.4 | 1:0.25 | 1:0.37 | 1:0.5 | 1:0.5 | 1:0.4 |

Print evaluation tests

With the above inks of Example B, Tests 1 to 6 described above were conducted. The results are summarized in the following table.

TABLE 6

| Test | | Test paper | Ink Example | | | | | | | |
|---|---|---|---|---|---|---|---|---|---|---|
| | | | C1 | C2 | C3 | C4 | C5 | C6 | C7 | C8 |
| 1. | Reproduction of black | (1) | ⊚ | Δ | ⊚ | ⊚ | ⊚ | Δ | ○ | ⊚ |
| | | (2) | ⊚ | ○ | ⊚ | ⊚ | ⊚ | ○ | ○ | ⊚ |
| | | (3) | ⊚ | ○ | ⊚ | ⊚ | ⊚ | ○ | ○ | ⊚ |
| | | (4) | ⊚ | ○ | ⊚ | ⊚ | ⊚ | ○ | ○ | ⊚ |
| | | (5) | ⊚ | ⊚ | ⊚ | ⊚ | ⊚ | ⊚ | ⊚ | ⊚ |
| 2-1. | Quality of image | (1) | ⊚ | ⊚ | ⊚ | ⊚ | ⊚ | ⊚ | ⊚ | ⊚ |
| | | (2) | ⊚ | ⊚ | ⊚ | ⊚ | ⊚ | ⊚ | ⊚ | ⊚ |
| | | (3) | ⊚ | ⊚ | ⊚ | ⊚ | ⊚ | ⊚ | ⊚ | ⊚ |
| | | (4) | ⊚ | ⊚ | ⊚ | ⊚ | ⊚ | ⊚ | ⊚ | ⊚ |
| | | (5) | ⊚ | ⊚ | ⊚ | ⊚ | ⊚ | ⊚ | ⊚ | ⊚ |
| 2-2. | Bleed | (1) | ⊚ | ⊚ | ⊚ | ⊚ | ⊚ | ⊚ | ⊚ | Δ |
| | | (2) | ⊚ | ⊚ | ⊚ | ⊚ | ⊚ | ⊚ | ⊚ | ○ |
| | | (3) | ⊚ | ⊚ | ⊚ | ⊚ | ⊚ | ⊚ | ⊚ | ○ |
| | | (4) | ⊚ | ⊚ | ⊚ | ⊚ | ⊚ | ⊚ | ○ | Δ |
| | | (5) | ⊚ | ⊚ | ⊚ | ⊚ | ⊚ | ⊚ | ⊚ | ⊚ |
| 3. | Waterfastness | (1) | ○ | ○ | ○ | ○ | ○ | ○ | ○ | ○ |
| | | (2) | ○ | ○ | ○ | ○ | ○ | ○ | ○ | ○ |
| 4. | Resumption after clogging | | ⊚ | ○ | ○ | ⊚ | ⊚ | ○ | ⊚ | ○ |
| 5. | Drying speed | | ⊚ | ⊚ | ⊚ | ⊚ | ⊚ | ⊚ | ○ | ⊚ |
| 6. | Storage stability | | ○ | ○ | ○ | ○ | ○ | ○ | ○ | ○ |

What is claimed is:

1. An ink composition comprising at least a first group of dyes and a second group of dyes, the first group of dyes comprising a dye represented by the following formula (I) wherein $R^1$ is $PO(OM)_2$ at the m-position to the azo group and a dye represented by the following formula (I) wherein $R^1$ is COOM at the m-position to the azo group,

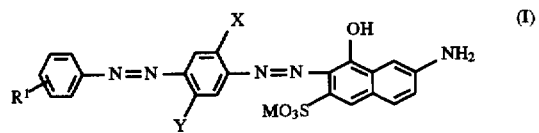
(I)

wherein $R^1$ represents —$PO(OM)_2$ or —COOM, X and Y each independently represent a $C_{1-4}$ alkoxy and M represents a cation of a group selected from the group consisting of a hydrogen atom, an alkali metal, ammonia, and an organic amine; and the second group of dyes comprising a dye represented by the following formula (II) and/or a dye represented by the following formula (III):

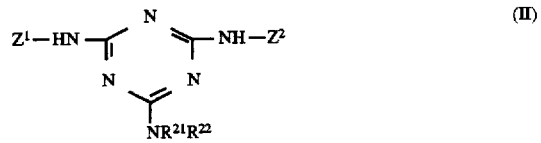
(II)

(III)

wherein $R^{21}$ and $R^{22}$ each independently represent a hydrogen atom or —$C_2H_4OH$. $Z^1$, $Z^2$, $Z^3$ and $Z^4$ each independently represent a group represented by the following formula (IV) or (V):

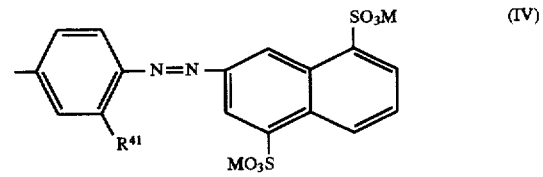
(IV)

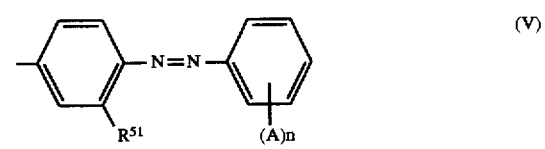
(V)

wherein $R^{41}$ and $R^{51}$ each independently represent a hydrogen atom, a $C_{1-4}$ alkyl or a $C_{1-4}$ alkoxy. A represents —$SO_3M$ or —COOM. M is as defined above and n is 1 or 2.

2. The ink composition according to claim 1, wherein the weight ratio of the dye represented by the formula (I) with $R^1$ being $PO(OM)_2$ at the m-position to the azo group to the dye represented by the formula (I) with $R^1$ being COOM at the m-position to the azo group is in the range of from 1:0.6 to 1:1.5.

3. The ink composition according to claim 1, wherein the weight ratio of the first group of dyes to the second group of dyes is in the range of from 1:0.1 to 1:0.5.

4. The ink composition according to claim 1, wherein M in the formula (I) represents a cation of a volatile compound and M in the formula (II) and/or the formula (III) represents a cation of an alkali metal.

5. The ink composition according to claim 1, which further comprises a nitrogen-containing cyclic compound and a polyhydric alcohol.

6. An ink composition comprising a dye represented by the formula (I) defined in claim 1, wherein $R^1$ is $PO(OM)_2$ or COOM at the m-position to the azo group, and a dye represented by the following formula(VI):

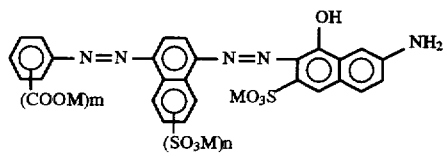

wherein M is as defined above;

m is 1 or 2;

n is 0 or 1.

7. The ink composition according to claim 6, which comprises the dye represented by the formula (I) and the dye represented by the formula (VI) in a weight ratio in the range of from 4:1 to 1:10.

8. An ink composition comprising a group A of dyes and a group B of dyes, the group A of dyes comprising (a) a dye represented by the following formula (I)

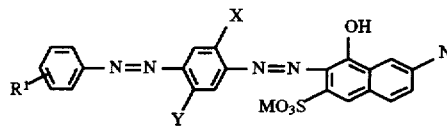

wherein $R^1$ represents $-PO(OM)_2$ or $-COOM$, X and Y each independently represent a $C_{1-4}$ alkoxy and M represents a cation of a group selected from the group consisting of a hydrogen atom, an alkali metal, ammonia, and an organic amine; and (b) a dye represented by the following formula (VI)

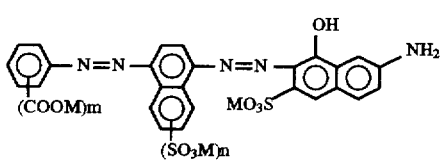

wherein M is as defined above;

m is 1 or 2;

n is 0 or 1;

the group B of dyes comprising a dye represented by the following formula (II) and/or a dye represented by the following formula (III):

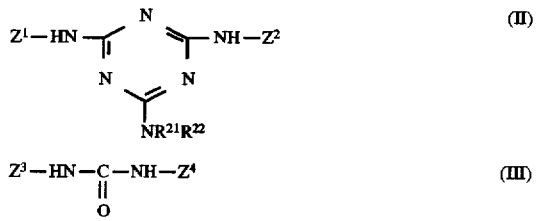

wherein $R^{21}$ and $R^{22}$ each independently represent a hydrogen atom or $-C_2H_4OH$, $Z^1$, $Z^2$, $Z^3$ and $Z^4$ each independently represent a group represented by the following formula (IV) or (V):

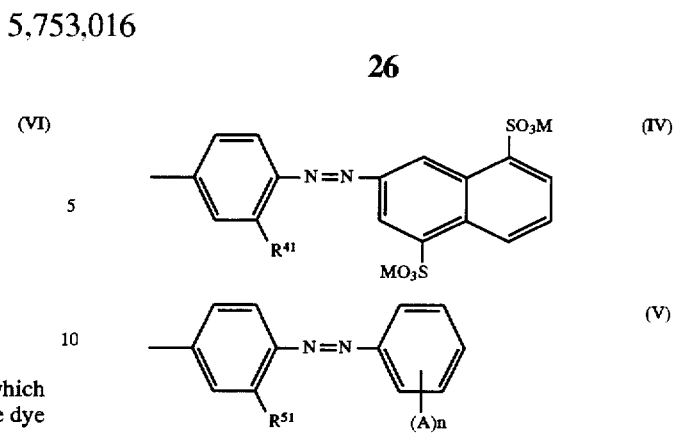

wherein $R^{41}$ and $R^{51}$ each independently represent a hydrogen atom, a $C_{1-4}$ alkyl or a $C_{1-4}$ alkoxy, A represents $-SO_3M$ or $-COOM$, M is as defined above and n is 1 or 2.

9. The ink composition according to claim 8, which comprises the dye represented by the formula (I) and the dye represented by the formula (VI) in a weight ratio in the range of from 4:1 to 1:10.

10. The ink composition according to claim 8, which comprises 1 to 20% by weight of the group A of dyes.

11. The ink composition according to claim 8, wherein the weight ratio of the group A of dyes to the group B of dyes in the ink composition is in the range of from 1:0.1 to 1:0.5.

12. The ink composition according to claim 8, wherein M in the formula (I) represents a cation of a volatile compound and M in the formula (II) and/or the formula (III) represents a cation of an alkali metal.

13. The ink composition according to claim 8, which further comprises a nitrogen-containing cyclic compound and a polyhydric alcohol.

14. The ink composition according to claim 1, which has been adjusted to pH 8.5–11 with a tri(hydroxyalkyl)amine.

15. The ink composition according to claim 1, which further comprises at least one hydroxide selected from the group consisting of the group Ia metallic elements of the periodic table.

16. The ink composition according to claim 1, wherein the hydroxide is LiOH, NaOH, or KOH.

17. The ink composition according to claim 1, which further comprises 3 to 30% by weight of a glycol ether.

18. The ink composition according to claim 1, which further comprises 0.1 to 5% by weight of a nonionic acetylene glycol surfactant.

19. The ink composition according to claim 1, which has a surface tension of 20 to 35 mN/m at a temperature of 0° to 50° C.

20. A recording method comprising the step of depositing an ink composition onto a recording medium to perform printing, wherein the ink composition is one according to claim 1.

21. An ink jet recording method comprising the steps of: ejecting droplets of an ink composition; and depositing the ejected droplets on a recording medium, wherein the ink composition is one according to claim 1.

22. A printed medium recorded by the recording method according to claim 20.

* * * * *